United States Patent
Choi et al.

(10) Patent No.: US 8,443,252 B2
(45) Date of Patent: May 14, 2013

(54) METHOD AND SYSTEM OF RELAYING DATA

(75) Inventors: Young Gon Choi, Yongin-si (KR); Hyun Cheol Park, Daejeon (KR); Eung Sun Kim, Yongin-si (KR); Jin Sae Jung, Yongin-si (KR); Jung Ho Kim, Yongin-si (KR); Kyle Kim, Yongin-si (KR); Ji Hoon Lee, Yongin-si (KR); Sung Won Lee, Yongin-si (KR); Yong Sung Roh, Yongin-si (KR); Jae Hong Kim, Daejeon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1062 days.

(21) Appl. No.: 11/708,631

(22) Filed: Feb. 21, 2007

(65) Prior Publication Data
US 2008/0065946 A1 Mar. 13, 2008

(30) Foreign Application Priority Data
Sep. 8, 2006 (KR) .................. 10-2006-0087006

(51) Int. Cl.
*H03M 13/29* (2006.01)

(52) U.S. Cl.
USPC .......................................... 714/755; 714/790

(58) Field of Classification Search .......... 714/755, 714/780, 790
See application file for complete search history.

(56) References Cited

U.S. PATENT DOCUMENTS

| 7,126,928 B2 * | 10/2006 | Tiedemann et al. .......... 370/329 |
| 7,787,524 B2 * | 8/2010 | Miyoshi et al. .............. 375/214 |
| 2003/0221156 A1 | 11/2003 | Berger et al. |
| 2007/0186136 A1 * | 8/2007 | Yue et al. .................. 714/752 |
| 2007/0217541 A1 * | 9/2007 | Liu et al. .................. 375/279 |
| 2008/0144512 A1 * | 6/2008 | Molisch et al. ............. 370/238 |
| 2008/0317168 A1 * | 12/2008 | Yang et al. ................. 375/298 |
| 2009/0092072 A1 * | 4/2009 | Imamura et al. ............ 370/315 |

FOREIGN PATENT DOCUMENTS

| JP | 2004-222197 | 8/2004 |
| KR | 2002-61414 | 7/2002 |
| KR | 2003-49178 | 6/2003 |
| KR | 2004-67623 | 7/2004 |
| KR | 2005-89554 | 9/2005 |
| KR | 2006-66023 | 6/2006 |

OTHER PUBLICATIONS

Zhang et al., "Capacity-Approaching Turbo Coding and Iterative Decoding for Relay Channels", IEEE Transactions on Communications, Nov. 2005, pp. 1895-1905.*

Zheng Zhang et al. (Nov. 2005), "Capacity-Approaching Turbo Coding and Iterative Decoding for Relay Channels." *IEEE Transactions on Communications.* vol. 53, No. 11: pp. 1895-1905.

Korean Office Action mailed Jul. 20, 2012, that issued in counterpart Korean Patent Application No. 10-2006-0087006; 4 pages in Korean language.

* cited by examiner

*Primary Examiner* — Stephen M Baker
(74) *Attorney, Agent, or Firm* — NSIP Law (57) ABSTRACT

A method and system of relaying data are provided. The data is encoded into a turbo codeword by using a convolutional turbo code encoder, and the turbo codeword is transmitted from a source to a relay and a destination after puncturing by a first puncturing operation. The first punctured turbo codeword which is received in the relay is de-punctured and regenerated in a decoding operation and the regenerated turbo codeword is transmitted from the relay to the destination in punctured form after puncturing by a second puncturing operation. The punctured turbo codewords received from the source and the relay by the destination are totaled together as a totaled single turbo codeword and the totaled single turbo codeword is completely decoded to recover the data.

13 Claims, 5 Drawing Sheets

TURBO CODEWORD $V = (V_0^{(0)} \, V_0^{(1)} \, V_0^{(2)}, \, V_1^{(1)} \, V_1^{(0)} \, V_1^{(2)}, \, V_2^{(0)} \, V_2^{(1)} \, V_2^{(2)},$
$V_3^{(0)} \, V_3^{(1)} \, V_3^{(2)}, \cdots )$ PUNCTURING PATTERN $P_S = \begin{bmatrix} 1 & 1 & 1 & 1 \\ 1 & 0 & 1 & 0 \\ 0 & 1 & 0 & 1 \end{bmatrix} \cdots$ FIRST PUNCTURED TURBO CODEWORD $\tilde{V} = V * P_S$
$= (V_0^{(0)} \, V_0^{(1)}, \, V_1^{(0)} \, V_1^{(2)}, \, V_2^{(0)} \, V_2^{(1)}, \, V_3^{(0)} \, V_3^{(2)}, \cdots )$

FIG. 4A x : INFORMATION SEQUENCE
y : PARITY SEQUENCE
Le : EXTRINCE SEQUENCE

FIG. 4B

RECOVERED TURBO CODEWORD $V = (V_0^{(0)} \ V_0^{(1)} \ V_0^{(2)}, V_1^{(1)} \ V_1^{(0)} \ V_1^{(2)},$
$V_2^{(0)} \ V_2^{(1)} \ V_2^{(2)}, V_3^{(0)} \ V_3^{(1)} \ V_3^{(2)}, \cdots )$ PUNCTURING PATTERN $P_R = \begin{bmatrix} 0 & 0 & 0 & 0 \\ 0 & 1 & 0 & 1 \\ 1 & 0 & 1 & 0 \end{bmatrix} \cdots$ SECOND PUNCTURED TURBO CODEWORD $\hat{V} = V * P_R$
$= (V_0^{(0)}, V_0^{(0)}, V_0^{(0)}, V_0^{(0)}, \cdots )$ $L_2$:EXTRINSIC SEQUENCE
$= (V_0^{(2)}, V_1^{(1)}, V_2^{(2)}, V_3^{(1)}, \cdots )$

FIG. 5

METHOD AND SYSTEM OF RELAYING DATA

CROSS-REFERENCE TO RELATED APPLICATIONS

This application claims the benefit under 35 U.S.C. §119 (a) of Korean Patent Application No. 10-2006-0087006, filed on Sep. 8, 2006, in the Korean Intellectual Property Office, the entire disclosure of which is hereby incorporated by reference.

BACKGROUND OF THE INVENTION

1. Field of the Invention

The present invention relates to a method and system of relaying data. More particularly, the present invention relates to a method and system in which a source, a relay, and a destination in a relay network jointly use a convolutional turbo code, and thus data relay capability may be improved.

2. Description of Related Art

A relay network facilitates a smooth communication of a shadow region and extends cell coverage. A communication performance between a base station and a mobile station may be improved by cooperation with a relay. A source refers to a transmitting station, the relay refers to a relay station and a destination refers to a destination station.

Figure 1:
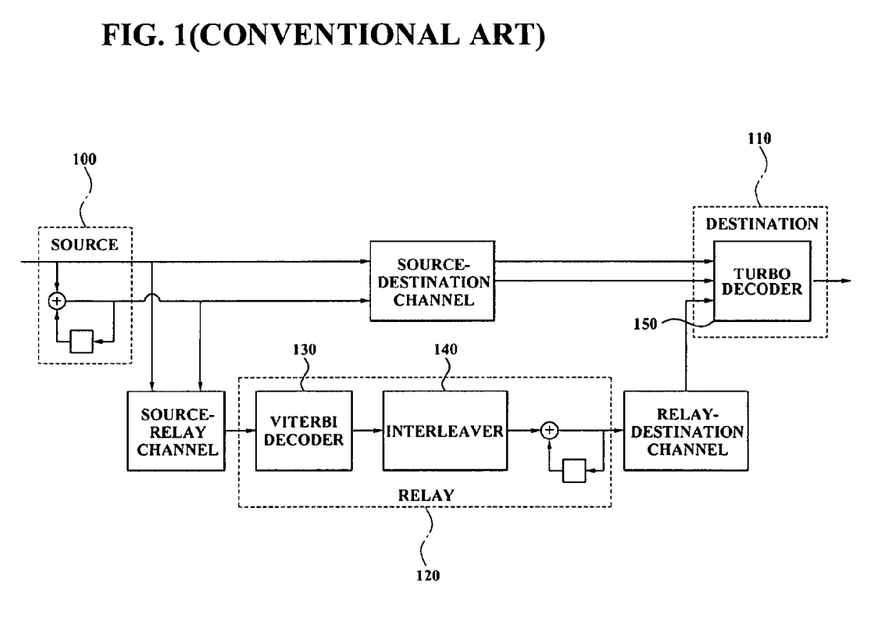
FIG. 1 is a diagram illustrating an example of a configuration of a relay system according to the conventional art.

FIG. 1 is a diagram illustrating an example of a configuration of a relay system according to conventional art.

As illustrated in FIG. 1, the relay system according to the conventional art transmits data from a source 100 to a destination 110 via a relay 120 by using a recursive systematic convolutional code. A data transmission in the relay system, according to the conventional art, may be performed in two separated time slots.

In a first time slot, an information bit of the data is convolutionally encoded in a convolutional encoder, and the convolutionally encoded information bit is transmitted from the source to the relay and the destination. In a second time slot, the data is restored in the relay by using a Viterbi decoder 130, and an information bit is obtained. Specifically, the relay 120 of the relay system according to the conventional art directly performs a decoding operation with respect to the data.

The information bit recovered in the relay is re-encoded in the convolutional encoder via an interleaver 140, and only a parity bit is transmitted to the destination.

A single convolutional turbo codeword comprises an information bit of the recursive systematic convolutional code received from the source 100 in the destination 110, and a parity bit received from the relay 120. Accordingly, a desirable information bit may be obtained in the destination via a turbo decoder 150.

However, a decode error may occur in the relay system according to the conventional art while recovering the data in the relay. Also, the decode error may be continuously transmitted to another communication node by the recursive systematic convolutional code.

Thus, a new relay system which may omit a re-encoding process by using convolutional turbo code in the source and the relay, and increase a coding gain is highly required.

Further, there is a need for an improved system and method of relaying data which recovers a turbo codeword instead of recovering/re-encoding the data in a relay to ultimately prevent an error which occurs in the data recovery process from being transmitted to another communication node.

SUMMARY OF THE INVENTION

A general aspect of the present invention is to address at least the above problems and/or disadvantages and to provide at least the advantages described below. Accordingly, a general aspect of the present invention is to provide a method and system of relaying data which recover a turbo codeword instead of recovering/re-encoding the data in a relay, and thereby may prevent an error which occurs in a data recovery process from being transmitted to another communication node.

A general aspect of the present invention also provides a method and system of relaying data in which a source, a relay, and a destination jointly use a recursive systematic convolutional turbo code when relaying the data via a relay network. A relatively higher coding gain may be obtained than when using a conventional recursive systematic convolutional code.

A general aspect of the present invention also provides a method and system of relaying data which transmit the same data via two independent paths by using a single relay, and thereby may obtain a diversity gain.

A general aspect of the present invention also provides a method and system of relaying data which may flexibly control a transmission of a parity bit set from a relay to a destination to improve a reliability of a data recovery, and thereby may apply a hybrid automatic repeat request (H-ARQ) to a relay system.

A general aspect of the present invention, a method of relaying data is provided where data is encoded into a turbo codeword by using a convolutional turbo code encoder. The turbo codeword is transmitted from a source to a relay and a destination after puncturing by a first puncturing operation. The first punctured turbo codeword which is received in the relay is de-punctured and recovered in a decoding operation and the recovered turbo codeword is transmitted from the relay to the destination in punctured form after puncturing by a second puncturing operation. The punctured turbo codewords received from the source and the relay to by the destination is totaled together as a single turbo codeword and the totaled single turbo codeword is then completely decoded to recover the data.

A general aspect of the present invention, a system of relaying data comprises a an encoding first puncturing device, a code-recovering second puncturing device and a data recovering device. The encoding first puncturing device includes a turbo encoder which encodes the data into a turbo codeword of a convolutional turbo code, and which transmits the turbo codeword from a source to a relay and a destination in punctured form after a first puncturing operation is performed on the turbo codeword. The code-recovering second puncturing device includes a turbo decoder device which de-punctures the first punctured turbo codeword which is received in the relay and recovers the turbo codeword, and which transmits the recovered turbo codeword from the relay to the destination in punctured form after a second puncturing operation is performed on the recovered turbo codeword. The data recovering device totals the punctured turbo codewords received from the source and the relay to the destination together as a single turbo codeword, and fully decodes the totaled turbo codeword to recover the data.

Other aspects, advantages, and salient features of the invention will become apparent to those skilled in the art from the following detailed description, which, taken in conjunction with the annexed drawings, discloses general aspects of the invention.

BRIEF DESCRIPTION OF THE DRAWINGS

The above and other general aspects, features, and advantages of the present invention will be more apparent from the following description taken in conjunction with the accompanying drawings in which.

Throughout the drawings, the same drawing reference numerals will be understood to refer to the same elements, features and structures.

DETAILED DESCRIPTION

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 2:
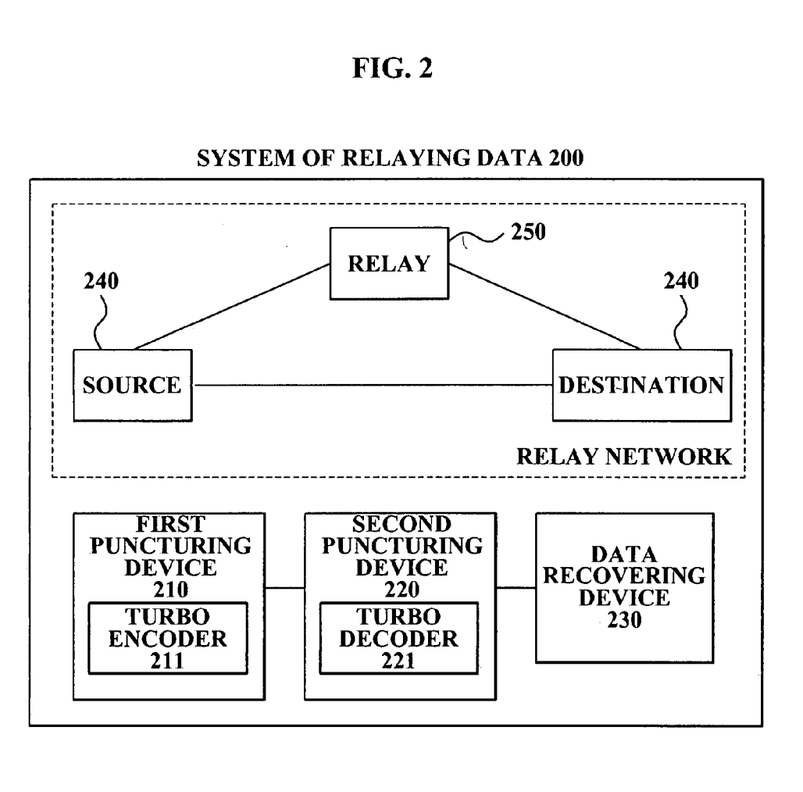
FIG. 2 is a diagram illustrating a configuration of a system of relaying data according to a general aspect of the present invention.

FIG. 2 is a diagram illustrating a configuration of a system of relaying data according to a general aspect of the present invention.

A relay network includes a source, a relay, and a destination as a communication node. The relay network is designed to transmit the data from the source to the destination by cooperating with the relay. According to a general implementation, the destination is located in a shadow region. The system of relaying data 200 which supports signal processing in the relay network may transmit the data which is received from the source to an area in which a service was conventionally unavailable. Accordingly, the system of relaying data according to a general implementation of the present invention may extend cell coverage and an area where a communication service is available.

In the system of relaying data 200, according to a general aspect of the present invention, the source 240, the relay 250, and the destination 260 jointly use a convolutional turbo code. Also, the system of relaying data 200 recovers a turbo codeword of the data instead of recovering the data in the relay. Accordingly, the system of relaying data 200 may overcome a disadvantage of a relay system using a conventional distributed turbo code. For example, the system of relaying data 200 may overcome the disadvantage of continuously transmitting an error which occurs while recovering/re-encoding the data in the relay.

For example, in the system of relaying data 200, a single parity bit set transmitted from the relay to the destination is generated through de-puncturing and recovering the turbo codeword. Accordingly, a data re-encoding process to generate a parity bit in the relay may be omitted. The system of relaying data 200, a general aspect of the present invention, may overcome the disadvantage of continuously transmitting the product of a decode error, which occurs while recovering/re-encoding the data in a conventional relay, to another communication node.

To support a signal process of the relay network using the convolutional turbo code, the system of relaying data 200 includes an encoding first puncturing device 210, a code-recovering second puncturing device 220, and a data recovering device 230.

The encoding first puncturing device 210 encodes the data into the turbo codeword by using the convolutional turbo code, and transmits the turbo codeword from the source to the relay and the destination in a punctured form after first puncturing the turbo codeword. For example, the encoding first puncturing device 210 includes a turbo encoder 211 for converting the data to be transmitted to a codeword of the convolutional turbo code. Also, the encoding first puncturing device 210 punctures the turbo codeword which is encoded by the turbo encoder 211.

For example, the encoding first puncturing device 210 prepares a puncturing pattern PS to facilitate the transmission of a parity bit set of the turbo codeword to the relay and the destination. According to a general implementation, the puncturing pattern PS is for the first puncturing.

For example, the encoding first puncturing device 210 generates the turbo codeword associated with the data comprising a first parity bit set and a second parity bit set by the turbo encoder 211. Also, the encoding first puncturing device 210 facilitates the transmission of a particular bit set of the turbo codeword according to the time slot from the source to the relay and the destination.

Figure 3A:
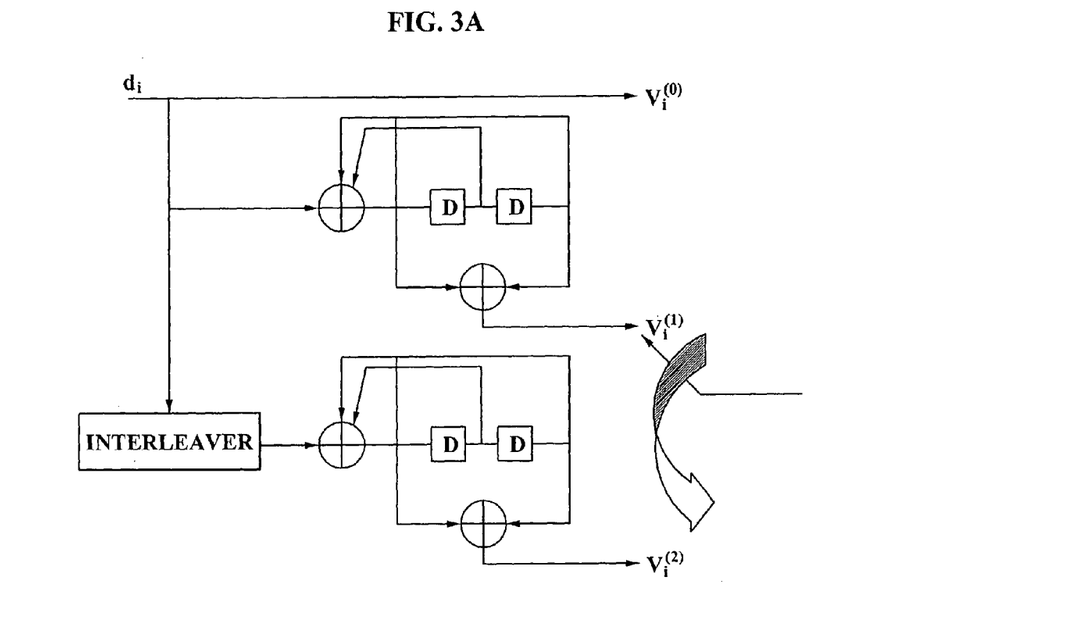
FIGS. 3A and 3B are diagrams illustrating an example of generating a first punctured turbo codeword according to a general aspect of the present invention.
Figure 3B:
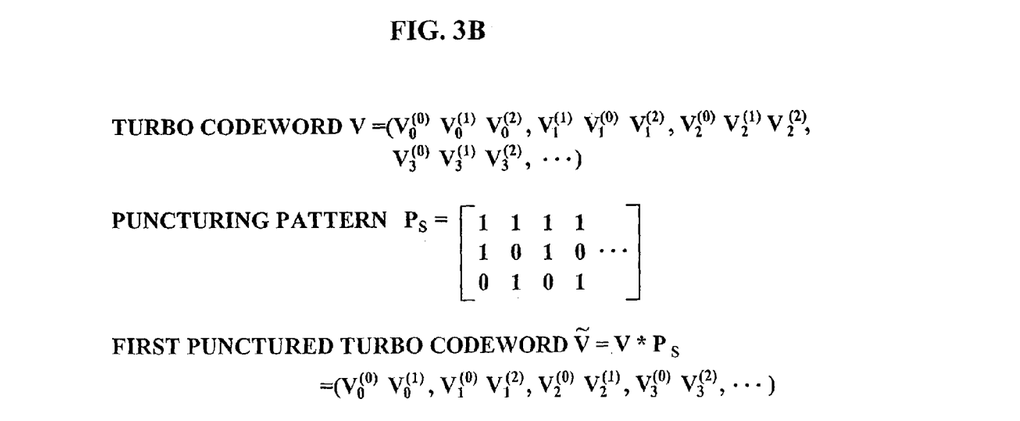

FIGS. 3A and 3B are diagrams illustrating an example of generating a first punctured turbo codeword according to a general aspect of the present invention.

FIG. 3A illustrates a schematic configuration of a turbo encoder 211. FIG. 3B illustrates an example of a first puncturing process with respect to a turbo codeword.

As illustrated in FIG. 3A, the turbo encoder 211 includes two convolutional encoders and an interleaver. The interleaver connects the two convolutional encoders. An input sequence $d_i$ associated with the data generates an output $Vi^{(0)}$, which is not encoded and an encoded output $Vi^{(1)}$, such as a first parity bit, via a first convolutional encoder. Also, the input sequence $d_i$ passes the interleaver and a second convolutional encoder, and generates an encoded output $Vi^{(2)}$, such as a second parity bit. According to a general implementation, the first parity bit $Vi^{(1)}$ refers to an output of the first convolutional encoder, and an information bit is input in its present state to the first parity bit $Vi^{(1)}$. Also, the second parity bit $Vi^{(2)}$ refers to an output of the second convolutional encoder in which an information bit mixed by the interleaver is input.

Accordingly, the turbo codeword generated by the turbo encoder 211 may be represented as $$V=(V_0^{(0)}V_0^{(1)}V_0^{(2)},V_1^{(0)}V_1^{(1)}V_1^{(2)},V_2^{(0)}V_2^{(1)}V_2^{(2)},V_3^{(0)}V_3^{(1)}V_3^{(2)},\ldots)$$

by considering a time slot, as illustrated in FIG. 3B.

An encoding first puncturing device 210 prepares a puncturing pattern $P_s$ to enable a parity bit set of the turbo codeword with respect to the time slot to be alternately transmitted. The encoding first puncturing device 210 first punctures the turbo codeword by the puncturing pattern $P_s$.

In a general aspect of the present invention, the first puncturing device 210 prepares $$\begin{bmatrix} 1 & 1 & 1 & 1 & \\ 1 & 0 & 1 & 0 & \cdots \\ 0 & 1 & 0 & 1 & \end{bmatrix}$$

as the puncturing pattern $P_s$. The first puncturing device 210 generates a first punctured turbo codeword $$\check{V}=(V_0^{(0)}V_0^{(1)}, V_1^{(0)}V_1^{(2)}, V_2^{(0)}V_2^{(1)}, V_3^{(0)}V_3^{(2)}, \ldots)$$

by computing processing with the turbo codeword $$V=(V_0^{(0)}V_0^{(1)}V_0^{(2)}, V_1^{(0)}V_1^{(1)}V_1^{(2)}, V_2^{(0)}V_2^{(1)}V_2^{(2)}, V_3^{(0)}V_3^{(1)}V_3^{(2)}, \ldots).$$

For example, the encoding first puncturing device 210 facilitates the transmission of information bits and a punctured parity bit set from the source to the relay and the destination, selected, by the puncturing pattern $P_S$.

Referring again to FIG. 2, a codeword-recovering second puncturing device 220 applies a codeword-recovering decoding process to the first punctured turbo codeword received in the relay, and transmits the recovered turbo codeword from the relay to the destination as a punctured codeword after performing a second puncturing operation on the recovered turbo codeword. For example, the codeword-recovering second puncturing device 220 includes a turbo decoder device 221. According to a general implementation, the turbo decoder device 221 repeatedly processes the first punctured turbo codeword received from the source, and recovers a turbo codeword. Also, the codeword-recovering second puncturing device 220 second punctures the turbo codeword recovered by the turbo decoder device 221 by a puncturing pattern PR.

The puncturing pattern $P_R$ is for selecting only a parity bit set of a turbo codeword which is not transmitted from the source, from the recovered turbo codeword. Unlike the conventional art, an environment may be acquired to generate the parity bit set to be transmitted to the destination without re-encoding the data in the relay.

For example, the codeword-recovering second puncturing device 220 recovers the first punctured turbo codeword as a turbo codeword comprising the information bit, the first parity bit, and the second parity bit. Also, the second puncturing device 220 selectively transmits the second parity bit to the destination. This parity bit is a parity bit that was not transmitted from the source due to the first puncturing.

Figure 4A:
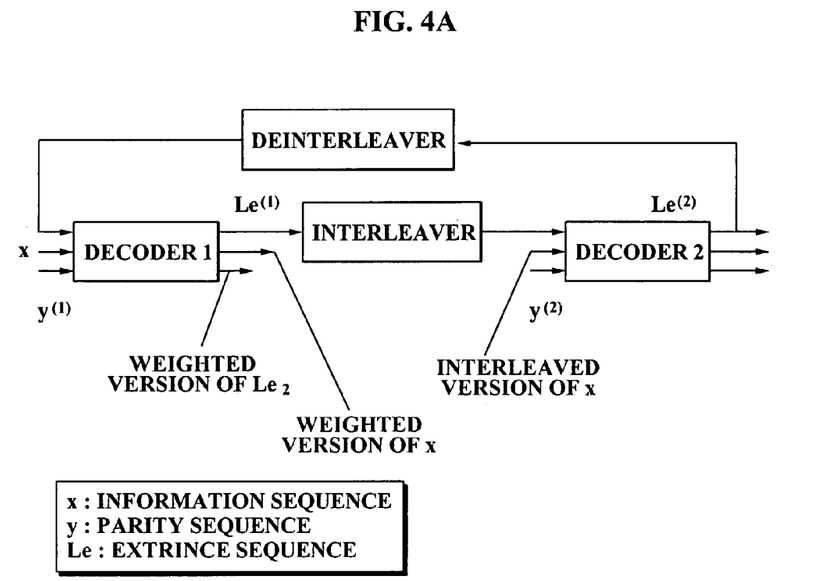
FIGS. 4A and 4B are diagrams illustrating an example of generating a second punctured turbo codeword according to a general aspect of the present invention.
Figure 4B:
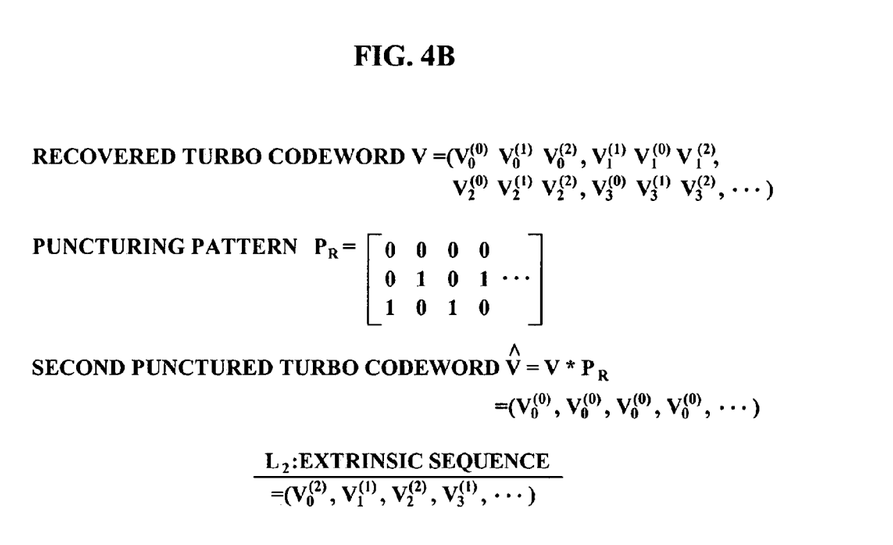

FIGS. 4A and 4B are diagrams illustrating an example of generating a second punctured turbo codeword according to a general aspect of the present invention.

FIG. 4B illustrates a schematic configuration of a turbo decoder 221. Part ii) of FIG. 4 illustrates an example of a second puncturing process with respect to a turbo codeword.

A maximum a posteriori (MAP) algorithm may be used as a decoding method in the turbo decoder device 221. The MAP algorithm generates information with respect to each bit. In the decoding method using the MAP algorithm, a decoding process is repeatedly performed to improve a result of the decoding process.

As illustrated in FIG. 4A, the turbo decoder 221 includes two MAP decoders, an interleaver, and a deinterleaver for repeatedly decoding. The turbo decoder 221 receives an information bit, a redundant bit, and an extrinsic bit from each of the MAP decoders, and outputs a log likelihood ratio with respect to each bit. Accordingly, the turbo codeword may be recovered. According to a general implementation, additional information comprising the log likelihood ratio becomes an end of priori information of a subsequent decoder, and may improve a reliability of the decoding.

Accordingly, the turbo codeword recovered by the turbo decoder 221 may be represented as $$V=(V_0^{(0)}V_0^{(1)}V_0^{(2)}, V_1^{(0)}V_1^{(1)}V_1^{(2)}, V_2^{(0)}V_2^{(1)}V_2^{(2)}, V_3^{(0)}V_3^{(1)}V_3^{(2)}, \ldots)$$

by considering a time slot, as illustrated in FIG. 4B.

A second puncturing device 220 recovers the original form of a turbo codeword from a first punctured turbo codeword.

Also, the second puncturing device 220 prepares a puncturing pattern $P_R$. The puncturing pattern $P_R$ facilitates the selective transmission of a parity bit of the turbo codeword which is not transmitted from the source to the destination. The second puncturing device 220 second punctures the turbo codeword recovered by the puncturing pattern $P_R$.

In a general aspect of the present invention, the second puncturing device 220 prepares $$\begin{bmatrix} 0 & 0 & 0 & 0 \\ 0 & 1 & 0 & 1 & \cdots \\ 1 & 0 & 1 & 0 \end{bmatrix}$$

as the puncturing pattern $P_R$. The second puncturing device 220 generates a second punctured turbo codeword $$\hat{V}=(V_0^{(2)}, V_1^{(1)}, V_2^{(2)}, V_3^{(1)}, \ldots)$$

by processing with the recovered turbo codeword $$V=(V_0^{(0)}V_0^{(1)}V_0^{(2)}, V_1^{(0)}V_1^{(1)}V_1^{(2)}, V_2^{(0)}V_2^{(1)}V_2^{(2)}, V_3^{(0)}V_3^{(1)}V_3^{(2)}, \ldots).$$

For example, the second puncturing device 220 facilitates the transmission of only a parity bit with a puncturing pattern different from a puncturing pattern of the source from the relay to the destination by the puncturing pattern $P_R$.

Referring again to FIG. 2, the data recovering device 230 totals the turbo codeword received from the source and the relay to the destination respectively as a single turbo codeword. Also, the data recovering device 230 decodes the totaled turbo codeword, and recovers the data. The data recovering device 230 may include the turbo decoder 221 illustrated in FIG. 4A, for decoding with respect to the totaled turbo codeword. For example, the data recovering device 230 decodes an information bit, a single parity bit, and another parity bit from the single turbo codeword. According to a general implementation, the information bit and the parity bit are received from the source to the destination, and the other parity bit is received from the relay to the destination.

In examples of both FIGS. 3A and 3B and FIGS. 4A and 4B, the source in a first time slot of repeated time slots transmits the information bit and a punctured parity bit to the relay and the destination. According to a general implementation, the data recovering device 230 totals the received information bit, a first parity bit, and a second parity bit. The data recovering device 230 thereby perfectly generates a turbo codeword.

The relay in a second time slot of the repeated time slots transmits a parity bit with a puncturing pattern different from a puncturing pattern of the source to the destination. According to a general implementation, the data recovering device 230 totals the information bit, the first parity bit, and the second parity bit received from the source and the relay, thereby generating the turbo codeword having the preferable form.

A process of recovering the data from the totaled turbo codeword in each of the time slots may be replaced with the process described with reference to FIGS. 4A and 4B.

In a method and system of relaying data, according to a general aspect of the present invention, the turbo codeword is recovered instead of decoding/re-encoding the data in the relay. Thus, an error which occurs in a data recovery process is prevented from being transmitted to another communication node.

Also, according to a general aspect of the present invention, the sources, the relay, and the destination jointly use a convolutional turbo code when relaying the data via a relay network, and thus a relatively higher coding gain than when using a conventional recursive systematic convolutional code may be obtained.

Also, according to a general aspect of the present invention, the same data is transmitted by using a single relay via independent two paths, and thereby may obtain a diversity gain.

Also, according to a general aspect of the present invention, a transmission rating of the parity bit transmitted from the relay to the destination to improve a reliability of a data recovery may be flexibly controlled, and thereby may apply a hybrid automatic repeat request (H-ARQ) to a relay system.

Figure 5:
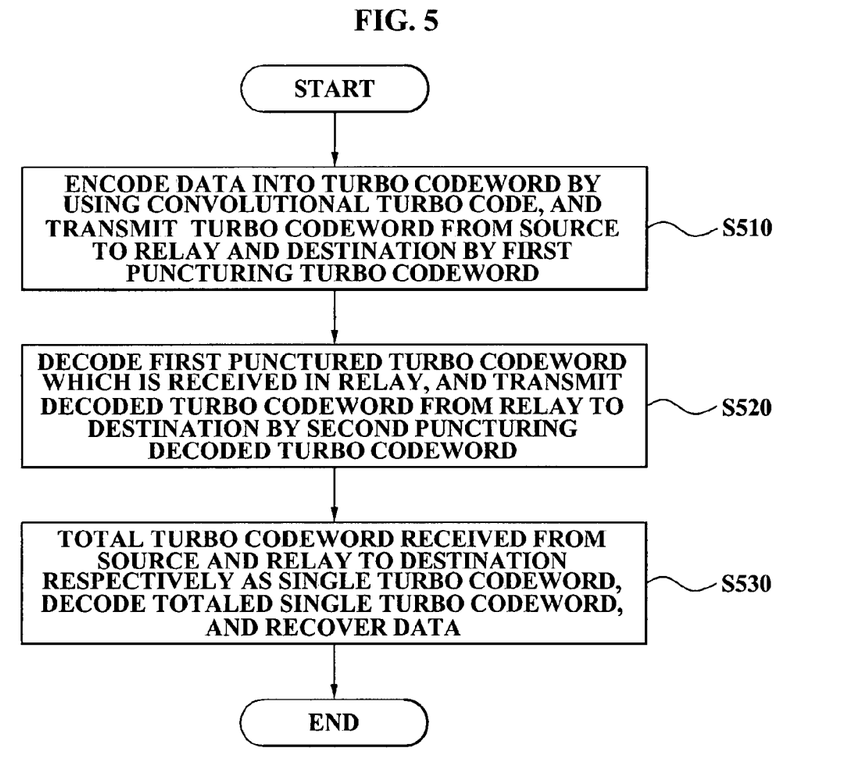
FIG. 5 is a flowchart illustrating a method of relaying data according to a general aspect of the present invention.

FIG. 5 is a flowchart illustrating a method of relaying data according to a general aspect of the present invention.

The method of relaying data, according to a general aspect of the present invention, may be performed by the system of relaying data 200.

In step S510, the system of relaying data 200 encodes the data into a turbo codeword by using a convolutional turbo code. In step S510, the data to be transmitted is converted to a codeword of the convolutional turbo code, thereby generating the turbo codeword.

For example, the system of relaying data 200 in step S510 prepares a puncturing pattern PS for a first puncturing, and facilitates the transmission of the turbo codeword to a relay and a destination.

For example, the system of relaying data 200 generates the turbo codeword comprising an information bit, a first parity bit, and a second parity bit. Also, the system of relaying data 200 transmits a particular bit of the turbo codeword from the source to the relay and the destination.

In a general aspect of the present invention, the turbo codeword may be represented as $$V=(V_0^{(0)}V_0^{(1)}V_0^{(2)}, V_1^{(0)}V_1^{(1)}V_1^{(2)}, V_2^{(0)}V_2^{(1)}V_2^{(2)}, V_3^{(0)}V_3^{(1)}V_3^{(2)}, \dots).$$

The system of relaying data 200 generates a first punctured turbo codeword $$\tilde{V}=(V_0^{(0)}V_0^{(1)}, V_1^{(0)}V_1^{(2)}, V_2^{(0)}V_2^{(1)}, V_3^{(0)}V_3^{(2)}, \dots).$$

by computing the puncturing pattern $P_S$ $$\begin{bmatrix} 1 & 1 & 1 \\ 1 & 0 & 1 & 0 & \cdots \\ 0 & 1 & 0 & 1 \end{bmatrix}$$

and the turbo codeword $$V=(V_0^{(0)}V_0^{(1)}V_0^{(2)}, V_1^{(0)}V_1^{(1)}V_1^{(2)}, V_2^{(0)}V_2^{(1)}V_2^{(2)}, V_3^{(0)}V_3^{(1)}V_3^{(2)}, \dots).$$

Accordingly, the system of relaying data 200 facilitates the transmission of the information bit and a punctured parity bit from the source to the relay and the destination by the puncturing pattern $P_S$, in a first time slot of repeated time slots.

In step S520, the system of relaying data 200 decodes the first punctured turbo codeword which is received in the relay. In step S520, the first punctured turbo codeword received in the relay is repeatedly decoded, and thereby recovering the turbo codeword.

In step S520, the system of relaying data 200 recovers the parity bit of the turbo codeword which is not transmitted from the source though a decoding with respect to the turbo codeword. Also, the system of relaying data 200 prepares a puncturing pattern PR to facilitate the transmission of the recovered parity bit to the destination. The puncturing pattern PR is for extracting only a parity bit of the turbo codeword which is transmitted from the source, from the recovered turbo codeword. Unlike the conventional art, an environment may be acquired to generate the parity bit to be transmitted to the destination without recovering the data in the relay.

For example, the system of relaying data 200 recovers the turbo codeword with a preferable form. According to a general implementation, the turbo codeword comprises the information bit, a first parity bit, and a second parity bit, from the first punctured turbo codeword. Also, the system of relaying data 200 selectively transmits the parity bit which is not transmitted from the source by a second puncturing.

In a general aspect of the present invention, the turbo codeword may be represented as $$V=(V_0^{(0)}V_0^{(1)}V_0^{(2)}, V_1^{(0)}V_1^{(1)}V_1^{(2)}, V_2^{(0)}V_2^{(1)}V_2^{(2)}, V_3^{(0)}V_3^{(1)}V_3^{(2)}, \dots)$$

by considering a time slot. The system of relaying data 200 generates a second punctured turbo codeword $$\hat{V}=(V_0^{(2)}, V_1^{(1)}, V_2^{(2)}, V_3^{(1)}, \dots)$$

by computing the puncturing pattern $P_R$ $$\begin{bmatrix} 0 & 0 & 0 & 0 \\ 0 & 1 & 0 & 1 & \cdots \\ 1 & 0 & 1 & 0 \end{bmatrix}$$

and the recovered turbo codeword $$V=(V_0^{(0)}V_0^{(1)}V_0^{(2)}, V_1^{(0)}V_1^{(1)}V_1^{(2)}, V_2^{(0)}V_2^{(1)}V_2^{(2)}, V_3^{(0)}V_3^{(1)}V_3^{(2)}, \dots).$$

Accordingly, the system of relaying data 200 enables only a parity bit having a puncturing pattern different from a puncturing pattern of the source to be transmitted from the relay to the destination by the puncturing pattern $P_R$, in a second time slot of repeated time slots.

In step S530, the system of relaying data 200 totals the turbo codeword received from the source and the relay to the destination respectively as a single turbo codeword, decodes the totaled single turbo codeword, and recovers the data. In step S530, an information bit, a single-omit parity bit, and another parity bit as from a single turbo codeword are decoded. According to a general implementation, the information bit and the parity bit are received from the source to the destination, and the other parity bit is received from the relay to the destination.

According to a general implementation, the source in the first time slot of repeated time slots transmits the information bit and a punctured parity bit to the relay and the destination. The data recovering device 230 totals the received information bit, a first parity bit, and a second parity bit, and thereby generating a turbo codeword having a preferable form. The relay in a second time slot of the repeated time slots transmits a parity bit having a puncturing pattern different from a puncturing pattern of the source to the destination. According to a general implementation, the data recovering device 230 totals the information bit received from the source and the relay, the first parity bit, and the second parity bit, and thereby generates the turbo codeword with a preferable form. Then, the system of relaying data 200 recovers the data from the totaled turbo codeword.

The general aspect of the present invention may be recorded in computer-readable media including program instructions to implement various operations embodied by a computer. The media may also include, alone or in combination with the program instructions, data files, and data structures, among others. The media and program instructions may be those specially designed and constructed for the purposes of the present invention. Alternatively, the media and program instructions may be well-known and available to those skilled in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, and wave guides, among others including a carrier wave transmitting signals specifying the program instructions, and data structures, among others. Examples of program instructions include both machine code, such as that produced by a compiler, and files containing higher level code that may be executed by the computer using an interpreter. The described hardware devices may be configured to act as one or more software modules in order to perform the operations of the above-described embodiments of the present invention.

According to a general aspect of the present invention, a method and system of relaying data recover/re-decode a turbo codeword instead of recovering/re-decoding data in a relay, and thereby may prevent an error which occurs in a data recovery process from being transmitted to another communication node.

Also, according to a general aspect of the present invention, in a method and system of relaying data, a source, a relay, and a destination jointly use a convolutional turbo code when relaying data via a relay network, and thus a relatively higher coding gain than when using a conventional recursive systematic convolutional code may be obtained.

Also, according to a general aspect of the present invention, a method and system of relaying data transmit the same data via two independent paths by using a single relay, and thereby may obtain a diversity gain.

Also, according to another general aspect of the present invention, a method and system of relaying data may flexibly control a transmission rating of a parity bit transmitted from a relay to a destination to improve a reliability of a data recovery, and thereby may apply an H-ARQ to a relay system.

While the present invention has been shown and described with reference to general aspects thereof, it will be understood by those skilled in the art that various changes in form and details may be made therein without departing from the spirit and scope of the invention as defined by the appended claims and their equivalents.

What is claimed is:

1. A method of relaying data, comprising:
    encoding the data into a turbo codeword of a convolutional turbo code, performing a first puncturing of the turbo codeword, and transmitting the first punctured turbo codeword from a source to a relay and a destination;
    recovering the turbo codeword from the first punctured turbo codeword, without recovering the data and without encoding the recovered data with the convolutional turbo code;
    performing a second puncturing of the recovered turbo codeword, and transmitting the second punctured turbo codeword from the relay to the destination; and
    totaling the first punctured turbo codeword received by the destination from the source and the second punctured turbo codeword received by the destination from the relay as a totaled single turbo codeword, decoding the totaled single turbo codeword, and recovering the data, wherein the first puncturing of the turbo codeword comprises preparing a first puncturing pattern to facilitate a puncturing of parity bits from alternating parity bit sets of the turbo codeword with respect to a time slot to the relay and the destination.

2. The method of claim 1, wherein the transmitting the first punctured turbo codeword comprises transmitting an information bit and a parity bit not removed by the first puncturing pattern, the turbo codeword including at least one of the information bit, a first parity bit, and a second parity bit.

3. The method of claim 1, wherein the performing of the second puncturing of the recovered turbo codeword is performed by the relay.

4. The method of claim 1, wherein the second puncturing of the recovered turbo codeword comprises:
    recovering a parity bit of the turbo codeword which is not transmitted from the source due to the first puncturing of the turbo codeword; and
    preparing a second puncturing pattern facilitating transmission of the recovered parity bit to the destination.

5. The method of claim 4, wherein the transmitting the second punctured turbo codeword comprises transmitting the recovered parity bit selected for transmission by the second puncturing pattern, the recovered turbo codeword including at least one of an information bit, a first parity bit, and a second parity bit.

6. A non-transitory computer-readable recording medium storing a program for implementing a data relay method, the program comprising:
    a first set of instructions configured to encode data into a turbo codeword according to a convolutional turbo code, perform a first puncturing of the turbo codeword, and transmit the first punctured turbo codeword from a source to a relay and a destination;
    a second set of instructions configured to recover the first punctured turbo codeword, without recovering the data and without encoding the recovered data with the convolutional turbo code, which is received in the relay, perform a second puncturing of the recovered turbo codeword, and transmit the second punctured turbo codeword from the relay to the destination; and
    a third set of instructions configured to total the first punctured turbo codeword received by the destination from the source and the second punctured turbo codeword received by the destination from the relay as a single totaled turbo codeword, and decode the totaled single turbo codeword to recover the data.

7. A system of relaying data, comprising:
    an encoding first puncturing device configured to perform a first puncturing of a turbo codeword and to transmit the first punctured turbo codeword from a source to a relay and a destination, the encoding first puncturing device comprising a turbo encoder configured to encode the data into the turbo codeword of a convolutional turbo code;
    a codeword-recovering second puncturing device configured to perform a second puncturing of a recovered turbo codeword, and to transmit the second punctured turbo codeword from the relay to the destination, the codeword-recovering second puncturing device comprising a turbo decoder device configured to recover the turbo codeword from the first punctured turbo codeword, without recovering the data and without encoding the recovered data with the convolutional turbo code; and
    a data recovering device configured to total the first punctured turbo codeword received by the destination from the source and the second punctured turbo codeword received by the destination from the relay as a single totaled turbo codeword, and decode the totaled single turbo codeword to recover the data, wherein the encoding first puncturing device is configured to prepare a first puncturing pattern to facilitate a transmission of parity bits from alternating parity bit sets of the turbo codeword with respect to a time slot to the relay and the destination.

8. The system of claim 7, wherein the encoding first puncturing device is configured to transmit an information bit and a parity bit selected for transmission by the first puncturing pattern, the turbo codeword comprising at least one of an information bit, a first parity bit, and a second parity bit.

9. The system of claim 7, wherein the codeword-recovering second puncturing device is configured to recover a parity bit of the turbo codeword which is not transmitted from the source, and prepare a second puncturing pattern facilitating transmission of the recovered parity bit to the destination.

10. The system of claim 9, wherein the codeword-recovering second puncturing device is configured to transmit the recovered parity bit as allowed by the second puncturing pattern, the turbo codeword comprising at least one of an information bit, a first parity bit, and a second parity bit.

11. A method of relaying data comprising:
    encoding message data into a turbo codeword of a convolutional turbo code;
    generating a first punctured turbo codeword having less than all of the information of the turbo codeword;
    transmitting the first punctured turbo codeword from a source to a relay and a destination;
    receiving the first punctured turbo codeword at the relay and the destination;
    recovering the turbo codeword by decoding the first punctured turbo codeword received by the relay, the turbo codeword being recovered without encoding, using the convolutional turbo code, information obtained by decoding the first punctured turbo codeword;
    generating a second punctured turbo codeword having less than all of the information of the recovered turbo codeword;
    transmitting the second punctured turbo codeword from the relay to the destination;
    receiving the second punctured turbo codeword at the destination; and
    recovering the message data by decoding the combined information of the received first and second punctured turbo codewords.

12. The method of claim 11, wherein the second punctured turbo codeword comprises parity information of the turbo codeword that was excluded from the first punctured turbo codeword.

13. The method of claim 11, wherein the second punctured turbo codeword comprises only parity information of the turbo codeword that was excluded from the first punctured turbo codeword.

* * * * *